(12) United States Patent
Liu et al.

(10) Patent No.: US 10,327,296 B2
(45) Date of Patent: Jun. 18, 2019

(54) DIMMING CIRCUIT, DIMMING METHOD AND LED DRIVING CIRCUIT

(71) Applicant: Joulwatt Technology (Hangzhou)Co., LTD., Hangzhou (CN)

(72) Inventors: Guoqiang Liu, Hangzhou (CN);
Pitleong Wong, Hangzhou (CN);
Yingyan He, Hangzhou (CN);
Yuancheng Ren, Hangzhou (CN);
Xunwei Zhou, Hangzhou (CN)

(73) Assignee: JOULWATT TECHNOLOGY (HANGZHOU)CO., LTD., Hangzhou (CN)

( * ) Notice: Subject to any disclaimer, the term of this patent is extended or adjusted under 35 U.S.C. 154(b) by 0 days.

(21) Appl. No.: 15/841,050

(22) Filed: Dec. 13, 2017

(65) Prior Publication Data
US 2018/0192491 A1 Jul. 5, 2018

(30) Foreign Application Priority Data
Dec. 30, 2016 (CN) .............................. 2016 1 125108

(51) Int. Cl.
*H05B 33/08* (2006.01)

(52) U.S. Cl.
CPC ..... *H05B 33/0845* (2013.01); *H05B 33/0812* (2013.01); *H05B 33/0827* (2013.01); *H05B 33/0857* (2013.01)

(58) Field of Classification Search
CPC ....... F21S 8/02; F21V 23/009; F21Y 2115/10; G02F 1/1336; G02F 2001/133601; G09G 2320/064; G09G 3/3406; Y02B 20/346; Y02B 20/347; Y02B 20/348; H05B 33/0809; H05B 33/0812; H05B 33/0815; H05B 33/0818; H05B 33/0824; H05B 33/0827; H05B 33/083; H05B 33/0845; H05B 33/0848; H05B 33/0857; H05B 33/0866; H05B 33/0884
See application file for complete search history.

(56) References Cited

U.S. PATENT DOCUMENTS

| 2008/0164828 | A1* | 7/2008 | Szczeszynski | ............ G05F 1/46 315/300 |
| 2011/0062887 | A1* | 3/2011 | Hsu | ..................... H05B 33/0818 315/294 |

(Continued)

*Primary Examiner* — Alexander H Taningco
*Assistant Examiner* — Renan Luque
(74) *Attorney, Agent, or Firm* — Treasure IP Group, LLC

(57) ABSTRACT

There is provided a dimming circuit, a dimming method and a LED driving circuit. On the basis of the dimming of a dimmer, the circuit according to the disclosure generates a plurality of current reference signals corresponding to a plurality of loads in accordance with a dimming signal, to change a ratio of load currents of the plurality of loads, so that, the adjustment of color temperature is implemented, wherein the dimming signal represents the changes of switching operation or dimming speed of the dimmer, and the ratio of current load currents of the plurality of loads is latched or a predetermined ratio of load currents is latched. According to the disclosure, the dimmer can be used for directly adjusting color temperature, without the need for a MCU, so that, the system compatibility is improved and the cost is decreased.

12 Claims, 3 Drawing Sheets

(56) References Cited

U.S. PATENT DOCUMENTS

| | | | | |
|---|---|---|---|---|
| 2011/0248648 | A1* | 10/2011 | Liu | G09G 3/3406 |
| | | | | 315/294 |
| 2011/0260643 | A1* | 10/2011 | Huang | G09G 3/3406 |
| | | | | 315/294 |
| 2012/0256553 | A1* | 10/2012 | Chen | H05B 33/0845 |
| | | | | 315/205 |
| 2013/0033194 | A1* | 2/2013 | Kang | H05B 33/0818 |
| | | | | 315/291 |
| 2013/0241430 | A1* | 9/2013 | Lee | H05B 33/0812 |
| | | | | 315/224 |
| 2014/0191671 | A1* | 7/2014 | Huang | H05B 33/0815 |
| | | | | 315/186 |
| 2015/0130861 | A1* | 5/2015 | Lee | H05B 33/0815 |
| | | | | 345/691 |
| 2015/0181671 | A1* | 6/2015 | Szczeszynski | H05B 33/0815 |
| | | | | 315/186 |
| 2016/0205741 | A1* | 7/2016 | Seki | H05B 33/0827 |
| | | | | 315/192 |
| 2016/0366733 | A1* | 12/2016 | Wang | H05B 33/0815 |
| 2017/0251532 | A1* | 8/2017 | Wang | H05B 33/0818 |

* cited by examiner

-- Prior Art --

DIMMING CIRCUIT, DIMMING METHOD AND LED DRIVING CIRCUIT

CROSS-REFERENCE TO RELATED APPLICATION

This application claims the benefit of Chinese Patent Application No. 201611254108.9, filed on Dec. 30, 2016, which is incorporated herein by reference in its entirety.

BACKGROUND OF THE DISCLOSURE

Field of the Disclosure

The present disclosure relates to the field of power electronics, and more particularly, to a dimming circuit, a dimming method and an LED driving circuit.

Background of the Disclosure

Dimmers are widely used in the field of lighting, for example, a triac dimmer can adjust an input voltage of a load by adjusting the conductive angle of the triac dimmer and a current of the load changes correspondingly to implement dimming. During process of replacing traditional lighting sources, LEDs can be compatible with an application using the triac dimmer, so that, the triac dimmer can also be used in an LED driving circuit.

In the prior art, although the triac dimmer implements the dimming of the LEDs, in the applications with color temperature adjustment, the triac dimmer cannot adjust color temperature. FIG. 1 is a schematic diagram of an example LED driving circuit using the triac dimmer according to the prior art. As shown in FIG. 1, LED1 and LED2 are two parallel loads respectively emitting cold-color light and warm-color light. An input voltage of the loads LED1 and LED2 is adjusted by a triac dimmer, thereby adjusting the average value of the output current of the loads accordingly. However, the color temperatures of the loads LED1 and LED2 are not influenced when only the conductive angle of the triac dimmer is adjusted. Accordingly, a color temperature adjusting circuit is required to be added, which usually uses a microcontroller (MCU) to adjust duty cycle of the two loads, that is, the MCU adjusts the duty cycle by respectively controlling switches S1 and S2 to be turned on and off, thereby adjusting color temperature.

The above only takes the triac dimmer as an example to illustrate the prior dimming technology, but the above-described technical problem generally exists in most of the dimmers. Obviously, in the above prior art, due to the addition of the MCU, a corresponding communication module, for example, a blue-tooth module, a Wi-Fi module, etc., is required to cooperate with the MCU, so that, the system cost becomes high and the dimmer cannot implement the adjustment of light brightness and color temperature at the same time.

SUMMARY OF THE DISCLOSURE

There is provided a dimming circuit, a dimming method and an LED driving circuit, wherein a triac dimmer is used to adjust color temperature, so that, the technical problem existing in the prior art, that the triac dimmer cannot be used to implement adjustment and the system cost is high, is solved.

A first technical scheme of the disclosure is to provide a dimming circuit having a following structure. The dimming circuit includes a reference signal generating circuit which is configured to receive a dimming signal, generate a plurality of current reference signals corresponding to a plurality of loads and adjust a ratio of load currents of the plurality of loads in accordance with the plurality of current reference signals, each of the plurality of current reference signal represents a reference current of a corresponding load of the plurality of loads.

Alternatively, each of the plurality of loads is connected in series with a linear regulation circuit, respectively, the linear regulation circuit is configured to sample a load current of a corresponding load of the plurality of loads, compare the load current of a corresponding load of the plurality of loads with the corresponding current reference signal of the plurality of current reference signals, for regulating the load current of the corresponding load of the plurality of loads, such that the load current of the corresponding load of the plurality of loads approaches a current value represented by the one of the plurality of current reference signals.

Alternatively, each of the plurality of loads is connected in series with a switching circuit, a duty cycle signal is generated as a control signal of a corresponding switching circuit according to one of the current reference signals, so that the ratio of load currents of the plurality of loads is adjusted.

Alternatively, while the dimming signal changes, a total load current which determines respective values of the plurality of current reference signals each representing a reference current of one of the plurality of loads, changes correspondingly, so that, the ratio of load currents of the plurality of loads is changed.

Alternatively, the reference signal generating circuit comprises a sampling and amplifying circuit, and a comparison circuit, the sampling and amplifying circuit samples the dimming signal or a total load current and obtains a sampled-amplified signal by using an operational amplifier to process the dimming signal or the total load current, the comparison circuit comprises a plurality of comparison units each corresponding to one of the plurality of loads, each of the plurality of comparison units has two input terminals for respectively receiving the sampled amplification signal and a ramp signal and an output terminal for outputting a duty cycle signal corresponding to a corresponding load of the plurality of loads and received by a control terminal of the switching circuit.

Alternatively, the reference signal generating circuit comprises a reference generation circuit and a reference distribution circuit, the reference generation circuit receives a signal representing a state of an adjusting transistor in the linear regulation circuit and generates a reference signal representing a total load current, the reference distribution circuit receives the reference signal representing the total load current and determines a distribution ratio of load currents of the plurality of loads to output the corresponding current reference signal.

Alternatively, the reference signal generating circuit comprising a reference generation circuit and a reference distribution circuit, the reference generation circuit receives a sampling signal representing a total load current and generates a reference signal representing a total load current, the reference distribution circuit receives the reference signal representing the total load current, determines a distribution ratio of load currents of the plurality of loads to output a corresponding one of the plurality of current reference signals, and superposes a bias voltage on at least one of the plurality of current reference signals.

Alternatively, the reference signal is adjusted according to the state of the adjusting transistor in the linear regulation circuit, thereby minimizing a voltage drop of at least one adjusting transistor in the linear regulation circuit.

Alternatively, the value of the current reference signal received by the linear regulation circuit is changed according to the bias voltage, thereby minimizing a voltage drop of at least one adjusting transistor in the linear regulation circuit.

Alternatively, the dimming circuit latches the present ratio of load currents of the plurality of loads or a predetermined ratio of load currents in accordance with dimming speed or a switching operation of a dimmer, and after latching, the dimming circuit doesn't change the ratio of load currents of the plurality of loads but only changes the value of a total load current while dimming the dimmer.

Alternatively, when the adjustment of the ratio of load currents of the plurality of loads is recovered, the latched ratio of load currents is used as a present ratio of load currents, and on this basis, the dimmer adjusts the ratio of load currents.

A second technical scheme of the disclosure is to provide a dimming method including following steps: sampling a dimming signal and generating a plurality of current reference signals corresponding to a plurality of loads in accordance with the dimming signal, wherein each of the plurality of current reference signals represents a reference current of a corresponding one of the plurality of loads; and adjusting load currents of the plurality of loads in accordance with the plurality of current reference signals, to change a ratio of the load currents of the plurality of loads.

A third technical scheme of the disclosure is to provide an LED driving circuit including any one of the above referenced dimming circuit.

Comparing with the prior art, the circuit and method according to the disclosure have following advantages. On the basis of the dimming of a dimmer, the circuit generates a plurality of current reference signals corresponding to a plurality of loads in accordance with the dimming signal, to change a ratio of load currents of the plurality of loads, such that, the adjustment of color temperature is implemented, wherein the dimming signal represents switching operations or the changes of the dimming speed of the dimmer, and the present ratio of load currents of the plurality of loads is latched or a predetermined ratio of load currents is latched. According to the disclosure, the dimmer can be used for directly adjusting color temperature, without the need for a MCU, the system compatibility is improved and the cost is decreased.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF THE DISCLOSURE

Reference will now be made in detail to particular embodiments of the disclosure, examples of which are illustrated in the accompanying drawings. It will be understood that the disclosure is not limited to these examples. On the contrary, the disclosure is intended to cover alternatives, modifications and equivalents that may be included within the spirit and scope of the disclosure as defined by the appended claims.

Furthermore, in the following detailed description of the present disclosure, numerous specific details are set forth in order to provide a thorough understanding of the present disclosure. However, it will be readily apparent to one skilled in the art that the present disclosure may be practiced without these specific details.

Reference will now be made in detail to particular embodiments of the disclosure, examples of which are illustrated in the accompanying drawings. The accompanying drawings are illustrative and not intended to be limiting, but are examples of embodiments of the invention, which are simplified for explanatory purposes and are not drawn to scale.

Figure 1:
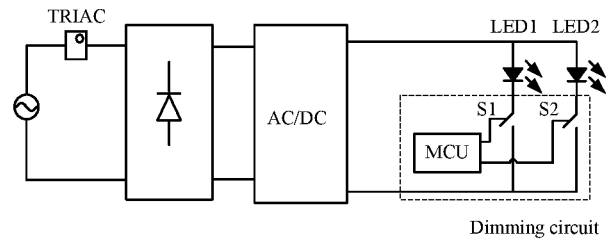
FIG. 1 is a schematic diagram of an example LED driving circuit using a triac dimmer according to the prior art.
Figure 2:
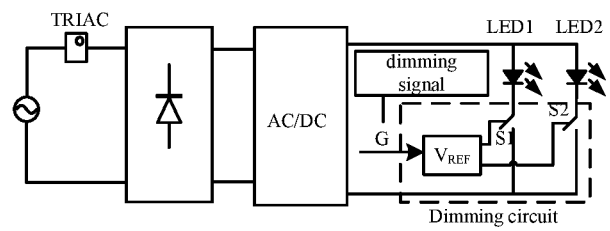
FIG. 2 is a schematic diagram of an example LED driving circuit using a triac dimmer according to an embodiment of the disclosure.

FIG. 2 is a schematic diagram of an example LED driving circuit using a triac dimmer according to an embodiment of the disclosure. The LED driving circuit includes a triac dimmer TRIAC, a rectifier bridge, and a power conversion circuit AC/DC. The rectifier bridge is configured to rectify an AC input signal which is received by the triac dimmer TRIAC and to output the rectified AC input signal to the power conversion circuit AC/DC. An output terminal of the power conversion circuit AC/DC is connected to a load. For convenience of illustration, here the load including two LED loads LED1 and LED2 connected in parallel is taken as an example, wherein the load LED1 and the load LED2 emit cold-color light and warm-color light, respectively. The triac dimmer is configured to adjust an average output current of the power conversion circuit AC/DC, thereby implementing dimming.

A reference current generating circuit $V_{REF}$ receives a dimming signal which represents the change of switching operation or conductive angle of the triac dimmer, for example, any one of an actual conductive angle, an actual turn-off angle of the dimmer, a total input current of the load, etc., can be taken as the dimming signal. The reference signal generating circuit $V_{REF}$ generates two current reference signals corresponding to the two loads, and adjusts the load currents of the two loads in accordance with the current reference signals, wherein each current reference signal represents a reference current of a corresponding load.

In the application of linear adjustment, each of the two loads is connected in series with a linear regulation circuit, respectively, and the switches S1 and S2 shown in FIG. 2 can be used as adjusting transistors in the linear regulation circuits. Each of the linear regulation circuit samples a load current of a corresponding load, compares the load current of the corresponding load with the current reference signal for adjusting the load current of the corresponding load, so that, the load current approaches to the current value represented by the current reference signal, thereby changing the ratio of the load currents of the loads LED1 and LED2. Thus, the adjustment of color temperature is implemented. The diagram is only used for illustration, so the linear regulation circuit is not drawn completely.

In the application of switching regulation (i.e., PWM regulation), each of the plurality of loads is connected in series with a switching circuit, respectively. In FIG. 2, the switches S1 and S2 can be used as simple switching circuits which generate corresponding duty cycle signals according to the current reference signals, and each of the duty cycle signals are used as a control signal of a corresponding switching circuit to adjust the load current of each load.

Figure 3:
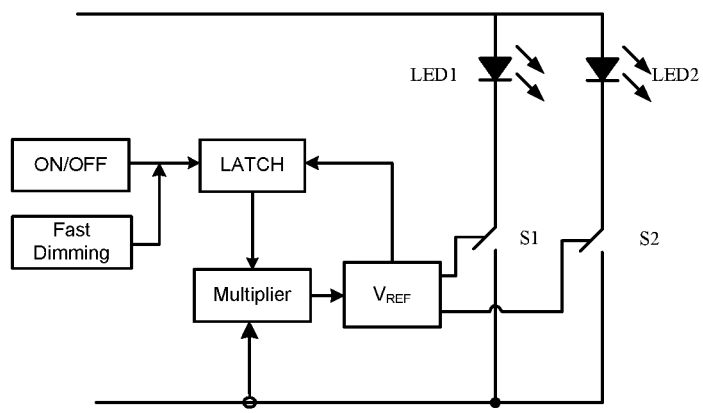
FIG. 3 is a schematic diagram of an example dimming circuit with an additional locking function on basis of the dimming circuit shown in FIG. 2, according to an embodiment of the disclosure.

FIG. 3 is a schematic diagram of an example dimming circuit with an additional locking function on basis of the dimming circuit shown in FIG. 2, according to an embodiment of the disclosure. The dimming circuit is applied to a variety of dimmer applications and can also be used in both of the linear regulation circuit and the switching circuit. In the embodiment, a latch module LATCH latches the present ratio of load currents of the plurality of loads or latches a predetermined ratio of load currents in accordance with the dimming speed (for example, the dimming speed under fast dimming) or switching operation (on/off) of the dimmer, after latching, the dimming circuit doesn't change the ratio of load currents of the plurality of loads but only changes the value of the total load current while dimming the dimmer. For example, while the fast dimming of the dimmer occurs, the ratio of load currents is latched, while the dimming speed of dimmer is recovered to be normal, the dimmer keeps the ratio of load currents unchanged but changes the total load current.

After the system is powered off for a while, the latched ratio of load currents is erased, at that time, the system is recovered to be in a default state to adjust the ratio of load currents.

Figure 4:
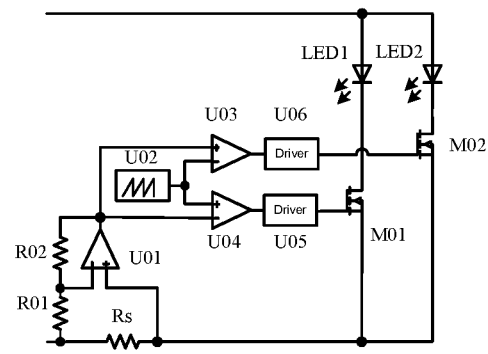
FIG. 4 is a schematic diagram of a first example reference signal generating circuit according to an embodiment of the disclosure.

FIG. 4 is a schematic diagram of a first example reference signal generating circuit according an embodiment of the disclosure. The reference signal generating circuit includes a sampling and amplifying circuit, and a comparison circuit. The sampling and amplifying circuit is configured to sample a dimming signal. Here, a total input current of the loads is used as the dimming signal, which is sampled by a resistor Rs, one terminal of the resistor Rs is connected with one input terminal of an operational amplifier U01 and the other terminal of the resistor Rs is connected with one terminal of a resistor R01. Resistors R01 and R02 are coupled in series, which have one common terminal being connected with the other input terminal of the operational amplifier U01. The other terminal of the resistor R02 is connected with an output terminal of the operational amplifier U01. The operational amplifier U01 outputs a sampled-amplified signal at its output terminal, and the sampled-amplified signal is proportional to the voltage across the resistor Rs, that is, the voltage across the resistor Rs is amplified. The sampled-amplified signal and a ramp signal are compared in comparison units of the corresponding comparison circuits, respectively. A comparator U03, as one of the comparison units, has a non-inverting input terminal for receiving the ramp signal, an inverting input terminal for receiving the sampled-amplified signal and an output terminal being connected with a control terminal of the switch M01 through a driver U05 and for outputting a duty cycle signal representing a duty cycle of the reference current of the load LED1. A comparison U04, as another one of the comparison units, has a non-inverting input terminal for receiving the sampled-amplified signal, an inverting input terminal for receiving the ramp signal, an output terminal being connected with a control terminal of the switch M02 through a driver U06 and for outputting a duty cycle signal of the reference current of the load LED2.

Figure 5:
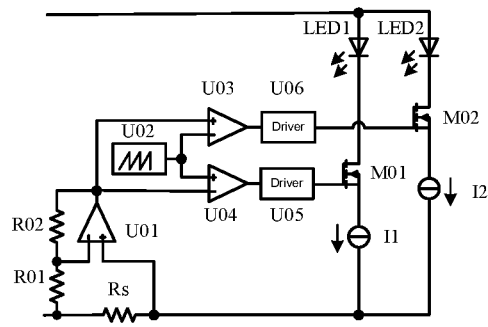
FIG. 5 is a schematic diagram of an improved example reference signal generating circuit on basis of the one shown in FIG. 4, according to an embodiment of the disclosure.

FIG. 5 is a schematic diagram of an improved example reference signal generating circuit on basis of the one shown in FIG. 4, according to an embodiment of the disclosure. In the embodiment, additional current sources I1 and I2 are introduced, the current sources I1 is connected with the switch M01 in series, the current source I2 is connected with the switch M02 in series. The current sources I1 and I2 are used for defining the maximum value of the load current of the corresponding load, respectively.

Figure 6:
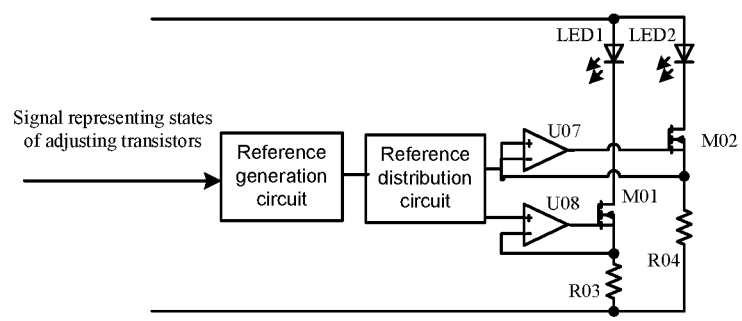
FIG. 6 is a schematic diagram of a second example reference signal generating circuit according to an embodiment of the disclosure.

FIG. 6 is a schematic diagram of a second example reference signal generating circuit according to an embodiment of the disclosure. The reference signal generating circuit includes a reference generation circuit and a reference distribution circuit. The reference generation circuit receives signals, such as, the voltage of LED load and the voltage of the control terminal of the adjusting transistor, which represents the states of the adjusting transistors in the plurality of linear regulation circuits. In the embodiment, the switches M01 and M02, as adjusting transistors in the linear regulation circuits, obtain a reference signal representing the total load current. Here, it is avoided that the reference signal representing the total load current is obtained by directly sampling the total load current using the sampling resistor. That is because that there is a specific delay time and feedback on the changes of load currents of the plurality of loads cannot be generated in time. Moreover, the voltage drop of the adjusting transistor can be determined according to the state of the adjusting transistor, by which, the ratio of currents can be adjusted accordingly, so that, the voltage drop of one adjusting transistor can be minimized, thereby achieving a purpose of power saving.

The reference distribution circuit receives the reference signal representing the total load current, determines the distribution ratio of load currents of the plurality of loads, and outputs the corresponding current reference signal. The current reference signals of the two loads are provided to one input terminal of an operational amplifier U07 and one input terminal of an operational amplifier U08, respectively, and the other input terminal of the operational amplifier U07 and the other input terminal of the operational amplifier U08 receive the sampled signals representing the load current of the corresponding load, respectively, and by adjusting the adjusting transistors M01 and M02, the load currents of the corresponding loads approach to the corresponding current reference signals. The branch circuit including the operational amplifier U07 and the adjusting transistor M02 is used as the linear adjustment circuit of the load LED2, the branch circuit including the operational amplifier U08 and the adjusting transistor M01 is used as the linear adjustment circuit of the load LED1, the resistors R03 and R04 are the sampling resistors of the corresponding circuits.

Figure 7:
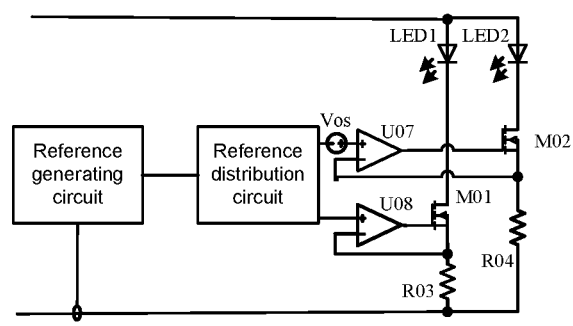
FIG. 7 is a schematic diagram of a third example reference signal generating circuit according to an embodiment of the disclosure.

FIG. 7 is a schematic diagram of a third example reference signal generating circuit according to an embodiment of the disclosure. The implement circuit and method are basically similar to those shown in FIG. 6, the reference generation circuit also receives the sampled signal representing the total load current, but a bias voltage Vos is used in FIG. 7. Due to the additional bias voltage Vos, the reference distribution circuit outputs the corresponding current reference signal after the completion of the reference distribution, and superposes the bias voltage Vos on the current reference signal corresponding to the load LED2, so that, the sum of the actual load currents of the two loads is greater than the reference signal representing the total load current, the switch M02 located in the same branch circuit with the load LED2 may be completely conductive to minimize the voltage drop of the switch M02, wherein the switches M01 and M02 is also referred to as the adjusting transistors of the linear regulation circuits.

It should be noted that although the bias voltage is superposed at the positive input terminal of the operational amplifier U07 in the figure, according to the circuit principle and actual condition, it can also be superposed at the negative input terminal under which condition the voltage polarity of the bias voltage needs to be adjusted. Further, the bias voltage can also be superposed at the positive and negative input terminals of the operational amplifier U08, that is, the bias voltage can be superposed at one or more branch circuit. In addition, the bias voltage may be a voltage controlled voltage source While the embodiments have been described and illustrated respectively, it is apparent to those skilled in the art that the common parts can be replaced and integrated between embodiments, and the content that is not explicitly described in one embodiment can refer to another embodiment which explicitly describes the content.

The preferred embodiments of the present invention are described in the above paragraphs, but not construed as limiting the present invention. Many modifications, equivalence, variations of the preferred embodiments can be made without departing from the doctrine and spirit of the present invention.

The invention claimed is:

1. A dimming circuit, comprising:
a dimmer, which is controlled to change a dimming signal for color temperature adjustment;
a reference signal generating circuit configured to, generate a plurality of current reference signals corresponding to a plurality of loads in accordance with said dimming signal, and
a driving circuit configured to adjust a ratio of load currents of said plurality of loads in accordance with said plurality of current reference signals,
wherein each of said plurality of current reference signals represents a reference current of a corresponding load of said plurality of loads,
wherein said plurality of loads at least comprise a first load with cold-color light and a second load with warm-color light, said first load is coupled with a first transistor in series and said second load is coupled with a second transistor in series, said plurality of current reference signal at least comprise a first current reference signal corresponding to said first load and a second current reference signal corresponding to said second load,
wherein under switching regulation mode, said reference signal generating circuit is configured to adjust a ratio between a first duty cycle of said first current reference signal and a second duty cycle of said second current reference signal in accordance with said dimming signal, said driving circuit is configured to switch said first transistor according to said first current reference signal and to switch said second transistor according to said second current reference signal,
wherein under linear adjustment mode, said reference signal generating circuit is configured to adjust a ratio between a first voltage value of said first current reference signal and a second voltage value of said second current reference signal in accordance with said dimming signal, said driving circuit is configured to control said first transistor according to a first error between a first loading current flowing through said first load and a reference current represented by said first current reference signal and to control said second transistor according to a second error between a second loading current flowing through said second load and a reference current represented by said second current reference signal.

2. The dimming circuit according to claim 1, wherein under linear adjustment mode, said driving circuit comprises a plurality of linear regulation circuits, each of said plurality of loads is connected in series with a linear regulation circuit, respectively, said linear regulation circuit is configured to sample a load current of a corresponding load of said plurality of loads, compare said load current of the corresponding load of said plurality of loads with a corresponding current reference signal of said plurality of current reference signals, for regulating said load current of said corresponding load of said plurality of loads, such that said load current of said corresponding load of said plurality of loads approaches a current value represented by one of said plurality of current reference signals.

3. The dimming circuit according to claim 1, wherein under switching regulation mode, said reference signal generating circuit comprises a sampling and amplifying circuit, and a comparison circuit, said sampling and amplifying circuit samples said dimming signal and obtains a sampled-amplified signal by utilizing an operational amplifier to process said dimming signal or said total load current, said comparison circuit comprises a plurality of comparison units each corresponding to one of said plurality of loads, each of said plurality of comparison units has two input terminals for respectively receiving said sampled-amplified signal and a ramp signal, said plurality of comparison units at least output a first duty cycle signal as said first current reference signal corresponding to said first load and a second duty cycle signal as said second current reference signal corresponding to said second load, control terminals of said first transistor and said second transistor are controlled by said first duty cycle signal and said second duty cycle signal respectively.

4. The dimming circuit according to claim 1, wherein under linear adjustment mode, said reference signal generating circuit comprises a reference generation circuit and a reference distribution circuit, said reference generation circuit receives a signal representing a state of said first transistor and said second transistor and generates a reference signal representing said total load current, said reference distribution circuit receives said reference signal representing said total load current and determines a distribution ratio of load currents of said plurality of loads to output said corresponding current reference signal.

5. The dimming circuit according to claim 2, wherein, said reference signal generating circuit comprising a reference generation circuit and a reference distribution circuit, said reference generation circuit receives a sampling signal representing said total load current and generates a reference signal representing said total load current, said reference distribution circuit receives said reference signal representing said total load current, determines a distribution ratio of load currents of said plurality of loads to output a corresponding one of said plurality of current reference signals, and superposes a bias voltage on at least one of said plurality of current reference signals.

6. The dimming circuit according to claim 4, wherein said reference signal is adjusted according to said state of said first transistor and said second transistor, thereby minimizing a voltage drop of at least one of said first transistor and said second transistor.

7. The dimming circuit according to claim 5, wherein, said value of said current reference signal received by said linear regulation circuit is changed according to said bias voltage, thereby minimizing a voltage drop of at least one of said first transistor and said second transistor.

8. The dimming circuit according to claim 1, wherein said dimming circuit latches said present ratio of load currents of said plurality of loads or a predetermined ratio of load currents in accordance with dimming speed or a switching operation of a dimmer, and after latching, said dimming circuit does not change said ratio of load currents of said plurality of loads but only changes said value of said total load current while dimming said dimmer.

9. The dimming circuit according to claim 8, wherein when said adjustment of said ratio of load currents of said plurality of loads is recovered, said latched ratio of load currents is utilized as a present ratio of load currents, and on this basis, said dimmer adjusts said ratio of load currents.

10. A dimming method, comprising following steps:
sampling a dimming signal and generating a plurality of current reference signals corresponding to a plurality of loads in accordance with said dimming signal, wherein each of said plurality of current reference signals represents a reference current of a corresponding one of said plurality of loads; and
adjusting load currents of said plurality of loads in accordance with said plurality of current reference signals, to change a ratio of said load currents of said plurality of loads,
wherein said plurality of loads at least comprise a first load with cold-color light and a second load with warm-color light, said first load is coupled with a first transistor in series and said second load is coupled with a second transistor in series, said plurality of current reference signal at least comprise a first current reference signal corresponding to said first load and a second current reference signal corresponding to said second load,
wherein under switching regulation mode, a ratio between a first duty cycle of said first current reference signal and a second duty cycle of said second current reference signal is adjusted in accordance with said dimming signal, said first transistor and said second transistor are switched according to said first current reference signal and said second current reference signal, respectively,
wherein under linear adjustment mode, a ratio between a first voltage value of said first current reference signal and a second voltage value of said second current reference signal is adjusted in accordance with said dimming signal, said first transistor is controlled according to a first error between a first loading current flowing through said first load and a reference current represented by said first current reference signal and said second transistor is controlled according to a second error between a second loading current flowing through said second load and a reference current represented by said second current reference signal.

11. An LED driving circuit, comprising: said dimming circuit according to claim 1.

12. The dimming circuit according to claim 1, wherein said dimming signal represents a corresponding parameter of said dimmer or a total load current which determines respective values of said plurality of current reference signals each representing a reference current of one of said plurality of loads.

* * * * *